US011461159B2

(12) United States Patent
Becker et al.

(10) Patent No.: US 11,461,159 B2
(45) Date of Patent: Oct. 4, 2022

(54) INTEGRATED CIRCUIT, EMBEDDED SYSTEM AND MOTOR VEHICLE

(71) Applicant: Robert Bosch GmbH, Stuttgart (DE)

(72) Inventors: Eugen Becker, Ludwigsburg (DE); Axel Aue, Korntal-Muenchingen (DE); Matthias Schreiber, Vaihngen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/160,969

(22) Filed: Jan. 28, 2021

(65) Prior Publication Data

US 2021/0294689 A1 Sep. 23, 2021

(30) Foreign Application Priority Data

Mar. 20, 2020 (DE) .......................... 102020203663.2

(51) Int. Cl.
*G06F 11/07* (2006.01)
*G06F 11/30* (2006.01)

(52) U.S. Cl.
CPC ...... *G06F 11/0772* (2013.01); *G06F 11/0784* (2013.01); *G06F 11/0793* (2013.01); *G06F 11/3041* (2013.01)

(58) Field of Classification Search
CPC ............. G06F 11/0772; G06F 11/0784; G06F 11/0793; G06F 11/3041
See application file for complete search history.

(56) References Cited

U.S. PATENT DOCUMENTS

| 9,875,165 B2* | 1/2018 | Huang ................ G06F 11/0706 |
| 10,902,166 B2* | 1/2021 | de Lescure ......... G06F 15/7825 |
| 11,063,594 B1* | 7/2021 | Ahmad ............ H03K 19/17728 |
| 2010/0158023 A1* | 6/2010 | Mukhopadhyay .. G06F 15/7825 370/401 |
| 2011/0320914 A1* | 12/2011 | Alves .................. G06F 11/1004 714/770 |
| 2015/0317095 A1* | 11/2015 | Voigt ...................... G06F 3/061 709/219 |
| 2020/0136861 A1* | 4/2020 | Ogawa .............. H04L 12/40006 |
| 2020/0267096 A1* | 8/2020 | Zinner .................. H04L 49/351 |
| 2021/0157760 A1* | 5/2021 | Kaler .................... H04L 9/0822 |

FOREIGN PATENT DOCUMENTS

DE 102016211768 A1 1/2018

\* cited by examiner

*Primary Examiner* — Matthew M Kim
*Assistant Examiner* — Kyle Emanuele
(74) *Attorney, Agent, or Firm* — Norton Rose Fulbright US LLP; Gerard Messina

(57) ABSTRACT

An integrated circuit. The circuit includes a communication module including shared ports, and an error management module for managing at least one case of an error. The circuit is configured to communicate on multiple internal communication channels via the ports. The error management module includes at least one hardware path for selectively switching off the individual communication channels in the case of an error.

12 Claims, 1 Drawing Sheet

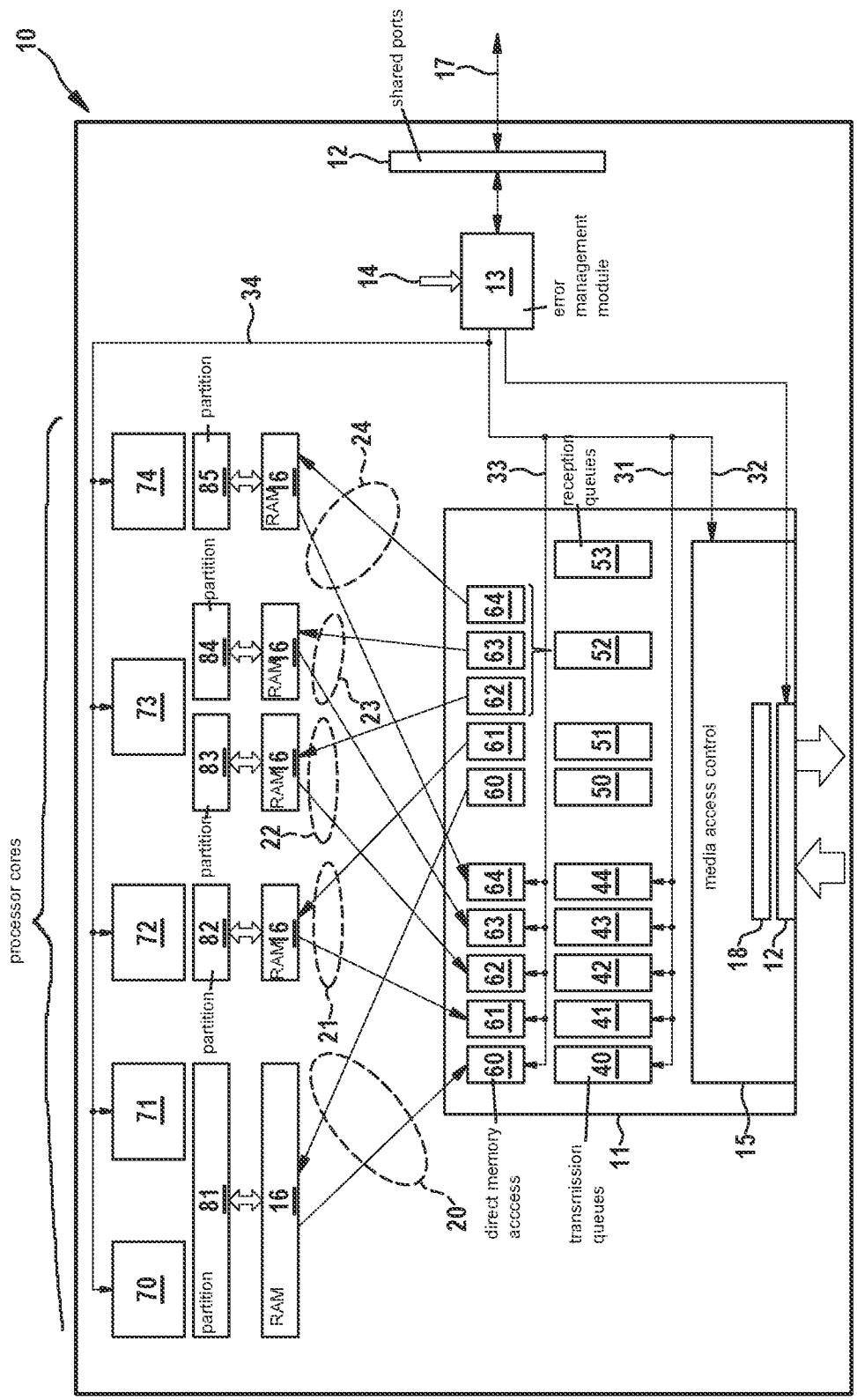

INTEGRATED CIRCUIT, EMBEDDED SYSTEM AND MOTOR VEHICLE

CROSS REFERENCE

The present application claims the benefit under 35 U.S.C. § 119 of German Patent Application No. 102020203663.2 filed on Mar. 20, 2020, which is expressly incorporated herein by reference in its entirety.

FIELD

The present invention relates to an integrated circuit, in particular, a microcontroller. The present invention further relates to an embedded system as well as a motor vehicle including such an integrated circuit.

BACKGROUND INFORMATION

Circuits for embedded systems according to the related art include multiple processor cores and complex peripheral functions such as Ethernet interfaces. Within the scope of the AUTOSAR standard, for example, individual software components are typically organized on shared multicore or multi-processor systems in logical application partitions for the purpose of virtualizing the system and creating protection boundaries.

German Patent Application No. DE 10 2016 211 768 A1 describes an integrated Ethernet communication module for media access control (MAC) per direct memory access (DMA).

SUMMARY

The present invention provides an integrated circuit, in particular in the form of a microcontroller (pC), an embedded system as well as a motor vehicle including such an integrated circuit.

Integrated Ethernet MAC communication modules having multiple queues and integrated DMA channels for transmitting and receiving are conventional. In multicore microcontroller and microprocessor architectures, these queues and DMAs may be assigned to different independent partitions or applications. A partition or an application has its own memory areas and may be executed on one CPU or distributed on multiple CPUs. In this case, the partition is regarded as a logic unit that is capable of accessing the Ethernet module. The operation of multiple partitions on one CPU is also possible.

Each partition communicates via an independent logic Ethernet communication channel and may not be influenced by other partitions with regard to guaranteed bandwidth and latency in order to ensure a deterministic behavior. A communication channel is characterized by its own MAC and/or IP address and usually includes a queue in the Ethernet communication controller (MAC), a DMA channel or DMA channels associated therewith and its own configuration. Transmitting and receiving by all defined communication channels takes place via the same Ethernet communication controller. Sending messages is controlled by establishing priorities or via the round-robin principle in the MAC layer.

The device according to an example embodiment of the present invention furthermore accounts for the fact that hardware errors in the pC that compromise the operational safety are typically managed in an error management module (EMM). Furthermore, there is an external error pin, in the case of which the defined functions in the pC may be switched off by an external monitoring module via EMM or directly.

A corresponding system response may be configured in the EMM for each error. In the case of communication modules according to the related art, the entire message content is considered to not be trustworthy as a rule in the case of an error. As a result of the error, a seemingly valid Ethernet packet may include a corrupt message. In order to prevent their transmission, the Ethernet transmission function is typically immediately deactivated at the media-independent interface (xMII) by the fault collection and control unit (FCCU) or the error pin in the case of an error. In this way, the transmission of faulty messages may be stopped in time. In systems having multiple partitions, all communication channels are, however, switched off simultaneously in this manner, although the occurred error may relate to only one partition and therefore only the communication of this partition must be prevented, while other partitions could continue with the transmission.

Against this background, separate hardware paths are provided from the central error management module as well as from the externally accessible error pins for the purpose of switching off one individual Ethernet communication channel of the module.

One advantage of this approach is the opened possibility of excluding in a targeted manner only that partition from the Ethernet communication that is subject to the error. In this way, other partitions may continue to communicate on the Ethernet bus in an undisturbed manner.

The measures described herein make advantageous refinements of and improvements on the disclosed embodiments of the present invention possible.

BRIEF DESCRIPTION OF THE DRAWINGS

Exemplary embodiments of the present invention are illustrated in the FIGURE and explained in greater detail in the description below.

The sole FIGURE shows the block diagram of a pC according to one specific embodiment of the present invention.

DETAILED DESCRIPTION OF EXAMPLE EMBODIMENTS

The FIGURE illustrates the basic design of a circuit 10 according to the present invention in the form of a microcontroller including multiple processor cores 70, 71, 72, 73, 74, some of which are combined to partitions 81, 82, 83, 84, 85 having a separated random access memory (RAM) 16. The microcontroller 10 moreover includes an Ethernet communication module 11 having shared ports 12 that manage transmission queues 40, 41, 42, 43, 44 and reception queues 50, 51, 52, 53 for multiple internal communication channels 20, 21, 22, 23, 24. Furthermore, the microcontroller includes a central error management module 13 having a hardware path 31, 32, 33, 34 that makes it possible to selectively switch off individual communication channels 20, 21, 22, 23, 24 in the case of an error 14. To make this object a reality, hardware path 31, 32, 33, 34 may take different courses, without departing from the scope of the present invention.

According to a first option 31, for example, the hardware path is configured to immediately lock or empty one of transmission queues 40, 41, 42, 43, 44. According to a second option 32, however, it merges directly into the MAC layer and is configured to exclude one of communication channels 20, 21, 22, 23, 24 from media access control 15. According to a third option 33, the hardware path is configured to deactivate direct memory access 60, 61, 62, 63, 64 on affected communication channel 20, 21, 22, 23, 24. Finally, according to a fourth option 34, the hardware path does not lead from error management module 13 to communication module 11, but to individual processor cores 70, 71, 72, 73, 74 that prevent the data transfer to affected communication channel 20, 21, 22, 23, 24 via interrupts according to the software in the case of an error 14.

Circuit 10 usually also includes an external error pin 17 for controlling error management module 13 as well as a conventional hardware path from error management module 13 directly to xMII interface 18.

A microcontroller of this type may be embedded in a motor vehicle as a system on chip (SoC) for example.

What is claimed is:

1. An integrated circuit, comprising:
multiple processor cores in the integrated circuit;
an Ethernet communication module in the integrated circuit, the Ethernet communication module including:
shared ports; and
a plurality of transmission queues and a plurality of reception queues, each corresponding one of the transmission queues and corresponding one of the reception queues being for a corresponding one of multiple internal communication channels, each of the internal communication channels providing communication for a corresponding one of the multiple processor cores, wherein the integrated circuit is configured to communicate from the multiple integrated circuit processor cores on the multiple internal communication channels via the ports; and
an error management module in the integrated circuit, the error management module configured to manage at least one case of an error, the error management module including at least one hardware path for selectively switching off individual ones of the communication channels in the case of the error, wherein the hardware path travels to at least one of: the plurality of transmission queues of the Ethernet communication module, or a media access control (MAC) layer of the Ethernet communication module.

2. The circuit as recited in claim 1, wherein:
the communication module is configured to manage the transmission queues and reception queues for the communication channels; and
the hardware path travels to the transmission queues and is configured to selectively lock or empty individual ones of the transmission queues and reception queues.

3. The circuit as recited in claim 1, wherein:
the communication module is configured for media access control; and
the hardware path travels to the MAC layer and is configured to exclude the individual ones of the communication channels from the media access control.

4. The circuit as recited in claim 1, wherein:
the circuit includes a random access memory;
the communication module is configured for a direct memory access to the random access memory; and
the hardware path travels to direct memory access channels and is configured to deactivate the direct memory access on the individual ones of the communication channels.

5. The circuit as recited in claim 1, wherein:
the circuit includes multiple processor cores;
the processor cores are combined to partitions to which the individual communication channels are assigned; and
the hardware path leads from the error management module to the processor cores.

6. The circuit as recited in claim 1 wherein the circuit includes at least one external error pin for controlling the error management module.

7. The circuit as recited in claim 1, wherein the communication module includes a media-independent interface, and a further hardware path leads from the error management module directly to the interface.

8. A microcontroller, comprising:
an integrated circuit, including:
multiple processor cores in the integrated circuit;
an Ethernet communication module in the integrated circuit, the Ethernet communication module including:
shared ports; and
a plurality of transmission queues and a plurality of reception queues, each corresponding one of the transmission queues and corresponding one of the reception queues being for a corresponding one of multiple internal communication channels, each of the internal communication channels providing communication for a corresponding one of the multiple processor cores, wherein the integrated circuit is configured to communicate from the multiple integrated circuit processor cores on the multiple internal communication channels via the ports; and
an error management module in the integrated circuit, the error management module configured to manage at least one case of an error, the error management module including at least one hardware path for selectively switching off individual ones of the communication channels in the case of the error, wherein the hardware path travels to at least one of: the plurality of transmission queues of the Ethernet communication module, or a media access control (MAC) layer of the Ethernet communication module.

9. An embedded system, comprising:
an integrated circuit, including:
multiple processor cores in the integrated circuit;
an Ethernet communication module in the integrated circuit, the Ethernet communication module including:
shared ports; and
a plurality of transmission queues and a plurality of reception queues, each corresponding one of the transmission queues and corresponding one of the reception queues being for a corresponding one of multiple internal communication channels, each of the internal communication channels providing communication for a corresponding one of the multiple processor cores, wherein the integrated circuit is configured to communicate from the multiple integrated circuit processor cores on the multiple internal communication channels via the ports; and
an error management module in the integrated circuit, the error management module configured to manage at least one case of an error, the error management module including at least one hardware path for selectively switching off individual ones of the communication channels in the case of the error, wherein the hardware path travels to at least one of: the plurality of transmission queues of the Ethernet communication module, or a media access control (MAC) layer of the Ethernet communication module.

10. A motor vehicle, comprising:
an embedded system including an integrated circuit, the integrated circuit including:
multiple processor cores in the integrated circuit;
an Ethernet communication module in the integrated circuit, the Ethernet communication module including:
shared ports; and
a plurality of transmission queues and a plurality of reception queues, each corresponding one of the transmission queues and corresponding one of the reception queues being for a corresponding one of multiple internal communication channels, each of the internal communication channels providing communication for a corresponding one of the multiple processor cores, wherein the integrated circuit is configured to communicate from the multiple integrated circuit processor cores on the multiple internal communication channels via the ports; and
an error management module in the integrated circuit, the error management module configured to manage at least one case of an error, the error management module including at least one hardware path for selectively switching off individual ones of the communication channels in the case of the error, wherein the hardware path travels to at least one of: the plurality of transmission queues of the Ethernet communication module, or a media access control (MAC) layer of the Ethernet communication module.

11. A method of operating an integrated circuit, comprising:
communicating from multiple processor cores of the integrated circuit on multiple internal communication channels using an Ethernet communication module of the integrated circuit, the Ethernet communication module including shared ports and transmission and reception queues for the multiple internal communication channels;
selectively switching off, via at least one hardware path, individual ones of the communication channels in the case of an error, wherein the hardware path travels to at least one of: the plurality of transmission queues of the Ethernet communication module, or a media access control (MAC) layer of the Ethernet communication module.

12. The method as recited in claim 11, further comprising:
selectively locking or emptying, using the hardware path, individual ones of the transmission queues and reception queues.

\* \* \* \* \*